Patented Feb. 8, 1944

2,341,250

UNITED STATES PATENT OFFICE 2,341,250

SYNTHESIS OF CORTICOSTERONE

Everett S. Wallis and Purnendu nath Chakravorty, Princeton, N. J., assignors to Research Corporation, New York, N. Y., a corporation of New York No Drawing. Application February 5, 1940, Serial No. 317,418

13 Claims. (Cl. 260—397.1)

This invention relates to preparation of certain intermediates which may be useful in the preparation of corticosterone.

Corticosterone is a physiologically active compound or hormone which is present in the adrenal gland from which concentrates of the hormone, useful for the treatment of Addison's disease, have been prepared.

It is understood to have the following structural formula:

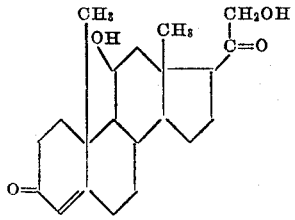

We start with the relatively readily obtainable compound, desoxycholic acid, a bile acid obtainable from slaughter houses and having the structural formula

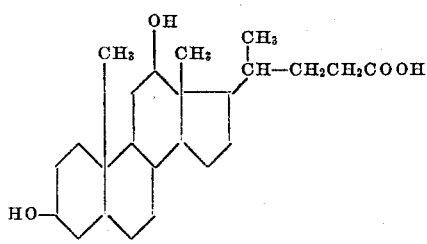

The conversion of this desoxycholic acid into a desirable intermediate in the direction of corticosterone synthesis involves the two problems of substituting the OH group in the $C_{12}$ position of the desoxycholic acid by hydrogen and introducing a double bond at the C 9–11 position which double bond may then be converted by suitable methods to the corresponding saturated $C_{11}$ oxylated compound. The desoxycholic acid is oxidized directly to 3-hydroxy-12-ketocholanic acid by the method described by Kaziro and Shimada, i. e. by the action of a solution of chromic oxide in acetic acid containing 7% of water, the reaction mixture being maintained at a temperature of 0° C. to 5° C. The 3-hydroxy-12-ketocholanic acid is obtained in good yields and is readily separated and purified by conventional methods. The methyl ester of this acid melts at 143° C. The 3-hydroxy-12-ketocholanic acid is acetylated (the acetoxy derivative melts at 197° C.) and then brominated by treatment with bromine in either chloroform or acetic acid solution in the presence of hydrogen bromide at 70° C. yielding 3-acetoxy-11-bromo-12-ketocholanic acid. This bromide is a white crystalline solid having a melting point of 184° C. This compound is dehydrohalogenated, introducing the double bond, by treatment with sodium ethylate in absolute alcohol at water bath temperature for ½ hour and yields a white crystalline solid, 3-hydroxy-12-keto-9:11-cholenic acid, having a melting point of 172–173° C. Its acetate melts at 199° C.

It is of interest to note at this point that dehydrohalogenation by means of zinc and acetic acid yields the saturated 3-hydroxy-12-ketocholanic acid and also that dehydrohalogenation with sodium acetate and acetic acid failed to give the desired product.

The above product, 3-hydroxy-12-keto-9:11-cholenic acid, is treated with an alcohol solution of semicarbazide acetate or semicarbazide hydrochloride with sodium acetate to produce the semicarbazone having a melting point of 221° C. The semicarbazone is reduced by heating with sodium ethylate in a sealed tube at 180° C. for 15 hours yielding the corresponding methylenic compound in readily crystallizable form. It is contaminated, as would be expected, with a small amount of its epimer, B-3-hydroxy-9:11-cholenic acid but this latter compound is removed by recrystallization from acetone. α-3-hydroxy-9:11-cholenic acid crystallizes in needles from acetone and melts at 183–184° C. Its acetate melts at 165° C.

Further details of the process up to this point are given by the following reaction equations:

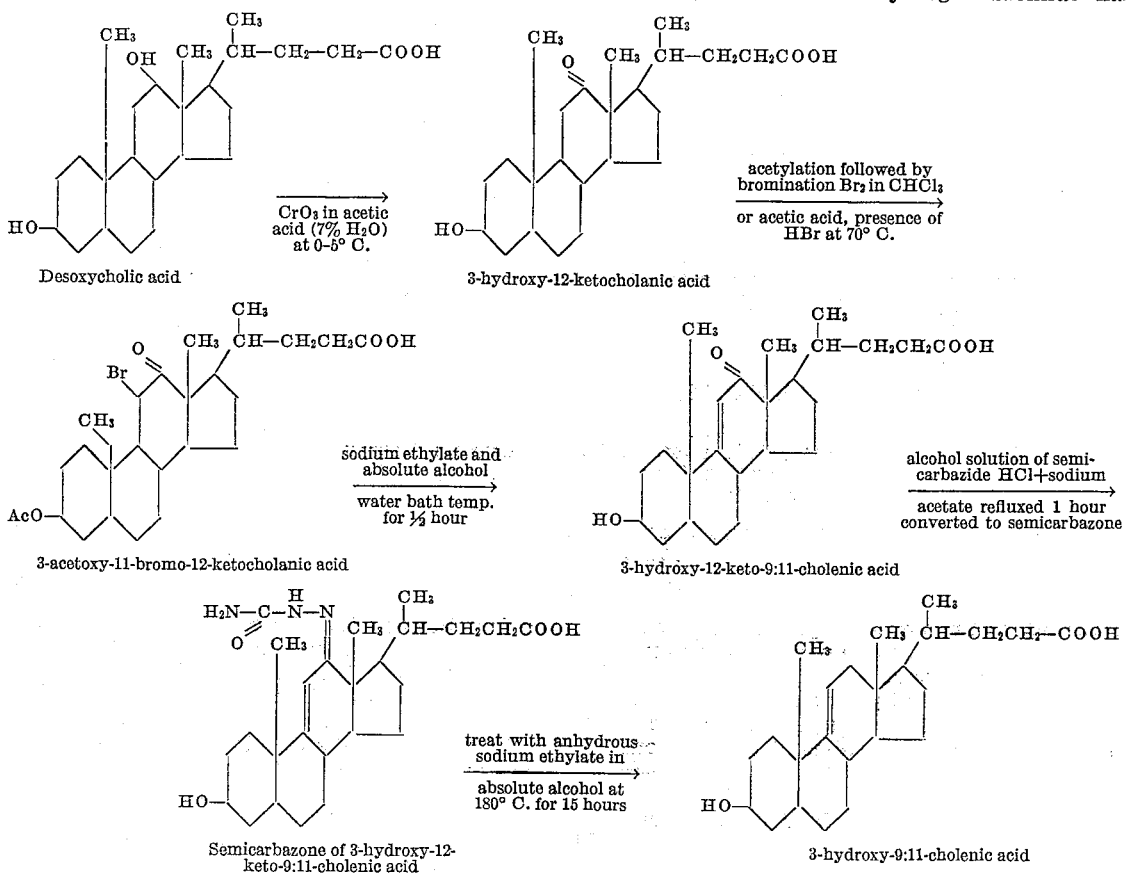

The step of brominating the 3-acetoxy-12-ketocholanic acid may be carried out by dissolving 5 grams of this acid in 15 cc. of glacial acetic acid and adding 15 cc. of a 1.05 N acetic acid solution of bromine. A few drops of a 34% aqueous solution of hydrogen bromide are added as catalyst. The solution is kept at 70° C. for 4 hours and then allowed to stand over night at room temperature. It is then poured into ice water and the amorphous powder which precipitates is separated by filtering. After thorough washing with water it is dissolved in ether and the ether solution washed to remove hydrogen bromide. After drying with $Na_2SO_4$ the ether is evaporated to dryness and the bromide obtained as a sticky reddish residue.

In the next step of the process, i. e. the dehydrohalogenation, this residue is taken up in absolute alcohol and poured into a hot solution of sodium ethylate (prepared from 6 g. of sodium dissolved in 70 cc. absolute alcohol). Immediately the mixture becomes very dark brown and some sodium bromide precipitates. Heating is continued for two hours after which time a considerable amount of sodium bromide has precipitated. The condenser is then removed and after sufficient water has been added to dissolve the salt the boiling is continued to remove as much of the alcohol as possible. The reaction mixture is then cooled with ice water and to it is added an ice cold solution of 20% sulfuric acid. After standing in the ice box for one half hour the precipitated acid so obtained is filtered and washed free from sulfuric acid. It is then taken up in ether and the dried ether solution decolorized with charcoal. The solution is then concentrated to a small volume and allowed to stand. (If the ether solution is perfectly dry and if the removal of hydrogen bromide has been complete, crystallization of the dissolved acid begins when the solution has reached about half its original volume.) The crystalline product so obtained is filtered and washed with cold ether. A sample of it melted at 160–165° C. Recrystallization from ethyl acetate gives a product which melted at 172–173° C. Its acetate melts at 199° C.

For the conversion of the 3-hydroxy-12-keto-9:11 cholenic acid described above into the 3-hydroxy-9:11 cholenic acid the following procedure may be employed. A portion of the acid (0.2 g.) is refluxed for two hours with an aqueous alcoholic solution of 0.2 g. semicarbazide acetate prepared from semicarbazide hydrochloride and 0.2 g. of anhydrous sodium acetate. The product is worked up in the usual manner. From benzene it comes down as a gelatinous precipitate which becomes crystalline when filtered and washed with ether. The crystals melt at 221° C. The semicarbazone is not further purified but is directly employed for the Wolf-Kishner reduction. The heating with sodium ethylate (made from 1 g. sodium and 15 cc. of absolute alcohol) is carried out in a sealed tube at 180° C. for fifteen hours. After this time the reaction product is taken up in water and boiled for one half hour on the water bath. After cooling with ice it is acidified with ice cold dilute sulfuric acid. The precipitate so obtained is filtered, washed thoroughly with water and then taken up in acetone. On crystallization needles are obtained which melt unsharply at 175° C. Several recrystallizations from acetone give a product which shows a strong positive Liebermann reaction and which melts at 183–184° C. The 3-hydroxy-9:11 cholenic acid may be acylated by conventional procedure to yield the 3-acetoxy-9:11 cholenic acid.

We claim:

1. Process which comprises oxidizing desoxycholic acid to 3-hydroxy-12-ketocholanic acid, acetylating and then brominating the latter to 3-acetoxy-11-bromo-12-ketocholanic acid, converting the latter to 3-hydroxy-12-keto-9:11-cholenic acid by treatment with sodium ethylate; converting the 3-hydroxy-12-keto-9:11-cholenic acid to the corresponding 12-semicarbazone by treatment thereof with semicarbazide acetate, reducing the resulting 12-semicarbazone compound to 3-hydroxy-9:11-cholenic acid by treatment with sodium ethylate and acetylating the product to the 3-acetoxy-9:11-cholenic acid.

2. Process which comprises oxidizing desoxycholic acid to 3-hydroxy-12-ketocholanic acid, acylating the 3-hydroxy-12-ketocholanic acid to 3-acyloxy-12-ketocholanic acid, halogenating the 3-acyloxy-12-ketocholanic acid to 3-acyloxy-11-halogeno-12-ketocholanic acid, dehydrohalogenating the latter compound by means of an alkali metal alkylate to the production of 3-hydroxy-12-keto-9:11-cholenic acid, forming the 12-semicarbazone of the latter compound, and reducing the semicarbazone compound to 3-hydroxy-9:11-cholenic acid.

3. Process which comprises oxidizing desoxycholic acid to 3-hydroxy-12-ketocholanic acid, acetylating the 3-hydroxy-12-ketocholanic acid to 3-acetoxy-12-ketocholanic acid, and brominating the 3-acetoxy-12-ketocholanic acid to 3-acetoxy-11-bromo-12-ketocholanic acid.

4. Process which comprises oxidizing desoxycholic acid to 3-hydroxy-12-ketocholanic acid, acetylating the 3-hydroxy-12-ketocholanic acid to 3-acetoxy-12-ketocholanic acid, brominating the 3-acetoxy-12-ketocholanic acid to 3-acetoxy-11-bromo-12-ketocholanic acid and dehydrobrominating the latter compound by means of an alkali metal alkylate to the production of 3-hydroxy-12-keto-9:11-cholenic acid.

5. Process which comprises dehydrobrominating 3-acetoxy-11-bromo-12-ketocholanic acid by a treatment with sodium ethylate in absolute alcohol, at water bath temperature, to the production of 3-hydroxy-12-keto-9:11-cholenic acid.

6. Process which comprises treating 3-hydroxy-12-keto-9:11-cholenic acid with semicarbazide acetate, to the production of 3-hydroxy-12-semicarbazone-9:11-cholenic acid, and reducing the resulting semicarbazone compound by heating the same with sodium ethylate, to the production of 3-hydroxy-9:11-cholenic acid.

7. A method of converting a 12-hydroxy compound containing the grouping

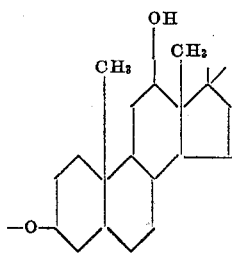

to the corresponding 9:11 unsaturated-12-desoxy compound which comprises oxidizing the 12-hydroxy compound to the corresponding 12-keto compound, halogenating the 12-keto compound to the corresponding alpha-halogeno compound, eliminating hydrogen halogenide from the alpha-halogeno compound to form the corresponding alpha-beta unsaturated keto compound; forming the semicarbazone of the alpha-beta unsaturated keto compound, and reducing the semicarbazone to the corresponding 9:11 unsaturated-12-desoxy compound.

8. A method of converting a 3:12-dihydroxy compound containing the grouping

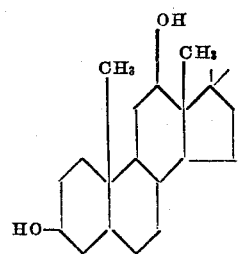

to the corresponding 9:11 unsaturated-12-desoxy compound which comprises oxidizing the 3,12 dihydroxy compound to the corresponding 3 hydroxy-12-keto compound; converting the 3 hydroxy-12-keto compound to the corresponding alpha-halogeno compound by halogenation after previously protecting the hydroxyl group in the 3-position by acylation; converting the alpha-halogeno compound thus formed to the corresponding alpha-beta unsaturated keto compound by treatment with an alkali metal alkylate in absolute alcohol; converting the alpha-beta unsaturated keto compound thus formed into the corresponding semicarbazone by treatment with an alcoholic solution of semicarbazide-HCl in the presence of an alkali metal acylate; converting the semicarbazone of the alpha-beta unsaturated keto compound thus formed into the corresponding 9:11 unsaturated-12-desoxy compound by treatment with anhydrous alkali metal alkylate, and converting the 9:11 unsaturated 12-desoxy compound into the corresponding acyloxy derivative.

9. Process which comprises halogenating a 3-acyloxy-12-keto cholanic acid to the corresponding 3-acyloxy-11-halogeno-12-keto cholanic acid, dehydrohalogenating the latter compound by means of an alkali metal alkylate to the production of 3-hydroxy-12-keto 9:11 cholenic acid, forming the 12-semicarbazone of the latter compound, and reducing the semicarbazone compound to 3-hydroxy-9:11-cholenic acid.

10. Process which comprises halogenating a 3-acyloxy-12-keto-cholanic acid to the corresponding 3-acyloxy-11-halogeno-12-keto cholanic acid.

11. Process which comprises halogenating a 3-acyloxy-12-keto-cholanic acid to the corresponding 3-acyloxy-11-halogeno - 12 - keto cholanic acid, and dehydrohalogenating the latter compound by means of an alkali metal alkylate to the production of 3-hydroxy-12-keto-9:11-cholenic acid.

12. A compound of the formula

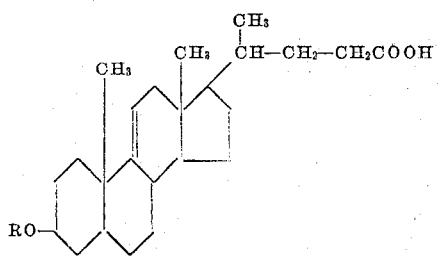

in which R stands for a member of the group consisting of hydrogen and acyl.

13. Process as defined in claim 4 in which the 3-hydroxy-12-keto-9:11-cholenic acid is converted to the corresponding 12-semicarbazone by treatment thereof with semicarbazide acetate and the resulting 12-semicarbazone compound is reduced to 3-hydroxy-9:11-cholenic acid by treatment with sodium ethylate.

EVERETT S. WALLIS.
PURNENDU NATH CHAKRAVORTY.